(12) United States Patent
Gardner

(10) Patent No.: US 10,266,092 B2
(45) Date of Patent: Apr. 23, 2019

(54) LOW CG DUMP TRAILER WITH HYDRAULICALLY LATCHED COVER

(71) Applicant: Frankie J. Gardner, Mt. Vernon, AR (US)

(72) Inventor: Frankie J. Gardner, Mt. Vernon, AR (US)

(*) Notice: Subject to any disclaimer, the term of this patent is extended or adjusted under 35 U.S.C. 154(b) by 0 days.

(21) Appl. No.: 15/465,500

(22) Filed: Mar. 21, 2017

(65) Prior Publication Data

US 2018/0178702 A1    Jun. 28, 2018

Related U.S. Application Data

(60) Provisional application No. 62/314,701, filed on Mar. 29, 2016.

(51) Int. Cl.
*B60P 1/16* (2006.01)
*B60P 1/28* (2006.01)

(52) U.S. Cl.
CPC ............ *B60P 1/16* (2013.01); *B60P 1/162* (2013.01); *B60P 1/28* (2013.01)

(58) Field of Classification Search
CPC .... B60P 1/16; B60P 1/283; B60P 1/28; B60P 1/162; B60P 1/045; B60P 1/006; B60P 1/165; B60P 1/286; B60P 1/34; B60P 1/26
USPC .... 298/22 R, 17 R, 22 C, 22 P, 7, 1 A, 17 B, 298/19 R, 26, 8 R; 296/183.2, 100.1, 296/183.1, 190.02, 191, 36, 50, 66; 414/408, 501, 55, 471, 708, 722, 724, 414/912
See application file for complete search history.

(56) References Cited

U.S. PATENT DOCUMENTS

| 3,450,431 | A | * | 6/1969 | Tyler | A01C 15/006 217/60 R |
|---|---|---|---|---|---|
| 3,690,717 | A | | 9/1972 | Taylor | |
| 3,913,969 | A | | 10/1975 | Hoch | |
| 4,120,513 | A | | 10/1978 | Hurt | |
| 4,132,323 | A | | 1/1979 | Simmons | |
| 4,627,658 | A | | 12/1986 | Vold et al. | |
| 5,190,341 | A | * | 3/1993 | Simard | B60J 7/1621 105/377.05 |
| 5,259,647 | A | | 11/1993 | Sanden | |
| 5,431,525 | A | * | 7/1995 | Scott | B60P 1/43 296/61 |
| 5,498,066 | A | | 3/1996 | Cuthbertson et al. | |
| 5,868,453 | A | | 2/1999 | Steigner | |
| 6,983,975 | B2 | | 1/2006 | Morrow | |

(Continued)

*Primary Examiner* — D Glenn Dayoan
*Assistant Examiner* — Sunsurraye Westbrook
(74) *Attorney, Agent, or Firm* — Stephen D. Carver

(57) ABSTRACT

An elongated trailer has a front neck for connection to the fifth wheel apparatus associated with a suitable tractor. The bed has a lowered, intermediate load portion disposed approximately in the trailer middle. A hydraulic ram raises or lowers the tiltable trailer which is suitably journalled for rotation at its mounting point. A pivoted cover atop the cargo bed can be shifted between open cargo-loading positions and closed cargo-hauling positions by hydraulic cylinders when unlocked. Slidable, hydraulically actuated locking tracks on each side of the top parallel with the cover support latches that can be shifted into or out of engagement with rigid tangs projecting from sides of the cover to forcibly clamp the cover shut. Hydraulic controls accessible from the ground control the apparatus.

14 Claims, 15 Drawing Sheets

(56) References Cited

U.S. PATENT DOCUMENTS

| | | | |
|---|---|---|---|
| 7,669,911 B1* | 3/2010 | Hankey | B60J 7/085 296/100.01 |
| 7,967,357 B2* | 6/2011 | Kloepfer | B60P 3/42 105/377.05 |
| 8,449,014 B2* | 5/2013 | Fliegl | B60J 7/141 296/100.02 |
| 8,701,565 B2* | 4/2014 | Creighton | B61D 7/00 105/377.01 |
| 8,876,217 B1 | 11/2014 | Medlen et al. | |
| 2011/0187148 A1 | 8/2011 | Damsi | |
| 2017/0015371 A1* | 1/2017 | Strong | B62D 53/04 |

* cited by examiner

LOW CG DUMP TRAILER WITH HYDRAULICALLY LATCHED COVER

CROSS REFERENCE TO RELATED APPLICATION

This utility conversion application is based upon, and claims priority from, previously filed U. S. Provisional Application Ser. No. 62/314,701, filed Mar. 29, 2016, and entitled "Low CG Dump Trailer with Hydraulically Latched Cover" by inventor Frankie J. Gardner.

BACKGROUND OF THE INVENTION

I. Field of the Invention

The present invention relates generally to heavy duty, hydraulically tilted trailers capable of carrying large loads while assuming a low profile characterized by a low center of gravity. More particularly, this invention relates to low profile, trailers with dump bodies comprising powered, upper coverings that are forcibly sealed shut during vehicle movement and hydraulic means for operating them.

II. Description of the Prior Art

It has long been recognized by those skilled in the art that open dump bodies, employed by trucks hauling waste, or fines or minerals, for example, should be closed to avoid inadvertent discharge of waste during travel. Typical top loading dump bodies are loaded through the open top, which must be covered to safely retain the loaded material during movements. Materials can be blown out of open dump bodies, for example, in response to high winds during travel. Accordingly, a variety of solutions have been proposed for various truck designs for closing the otherwise open truck bed or dump body. Earlier solutions involved a simple tarpaulin covering stretched over the trailer body top and anchored with tie-downs or bungee cords. The latter antique solution was time consuming and inefficient, unreliable and inconvenient for the truck operator. Later-developed, more reliable coverings for enclosing open-top semi-trailers vary between closures with flexible, roll-type covers seen on smaller dump trucks, to larger, heavier metallic covers involving rigid steel plates or large metallic sheets that are removably mounted atop a truck dump box. While such prior art dump body enclosures may include hydraulic or electrical actuators for opening and closing them, many covers are activated manually.

Small pickup trucks, for example, may employ a rigid, substantially plastic closure that may be secured with hinges coupled to the truck bed for easy manual operation. Such monolithic covers are impractical for larger dump trucks or semitrailers. Flexible, multi-section covers involving rigid, usually metal sections have been found to be more reliable for larger trucks. However, sectional covers with moving parts are relatively complex and expensive, at least for bearers of lighter loads, have not been widely adopted.

Importantly, debris carrying open-top semi-trailers, or those carrying loose commodities, are now subject to federal, state, and municipal statutes, laws or regulations which prohibit their uncovered use in transport on public roads or highways. Covering structures are mandated to to prevent debris or loose contents from escaping onto roads or the environment, thereby polluting. Almost universally coverings are mandated by law or regulation. In machines having top loading, hauling bodies it is desirable to provide a pivoting cover to retain the load in the body during travel of the machine. Otherwise, loads of material such as waste, grain, liquid and/or semi-liquid materials, sand, dirt and other fine material tend to be blown from the body by air currents resulting from ambient winds, air flow due to the speed of the machine or both.

Known bed tops or covers, especially of the flexible or foldable plate variety, can be secured by reel operated cables extending from the sides of the trailer. Special wrenches are used to tighten or loosen the reels. The person loading experiences substantial inconvenience, and manually manipulating the reels and the cover sections is a physical challenge. Often the operator has to climb over parts of the trailer and the load to access the tie-down apparatus The cover plates, because of their elongated size and configuration, are easily misaligned and improperly fastened.

In trucks of this nature stability is or course important. During over-the-road travel, stability of the load is increased when a "low-boy" configuration is adopted. In such as design, the load-bearing floor of the cargo area or tilt bed is nested between the trailers front and rear dual axles, occupying a plane that is below the top of the trailer wheels. When the bed is elevated for dumping the contents, it is important that stability be maximized as the load shifts considerably and the center of gravity changes. A full length cover, especially a heavy metallic or rigid steel one, when raised for loading, may adversely affect the stability of the truck during unloading, presenting the danger of tipping.

For certain loads, it is important that the covers be strong enough to retain the dump body contents, even during a crash or roll over. A heavy duty cover design of the type contemplated herein for hauling environmentally-dangerous waste or materials must adequately seal the load. In other words, the trailer bed must be adequately closed during transport to prevent the discharge of particulate matter that may escape from air pressure experienced in freeway travel, for example. Many environmental rules and regulations govern the disposition and handling of a variety of waste materials that must be routinely transported by truck. It is far less expensive and dangerous to design a covered dump bed that seals such a load, even during a "normal" truck accident or roll-over, rather than face an ecologically detrimental chemical spill and the environmentally required clean-up. It is also important that the covers can be actuated from the ground during use so that workers or drivers do not have to climb atop the trailer bed.

Despite the purported strength and durability of prior art trailers, modern regulations and operating conditions necessitate a more fool-proof bed closure design. Bed cover components must be operable without unnecessary complexity and time delays, but once closed, a suitable bed cover must rigidly lock the trailer bed to prevent escape of the cargo under extreme conditions, such as those encountered in a wreck or especially a trailer rollover. While on the highway a leak proof seal is necessary to prevent ingress of rain for example, but more particularly it is required for preventing escape of cargo material. Thus a reliable leak proof cover that is strong enough to seal a dangerous load to prevent spilling during a roll over, while being durable and flexible enough to create a decent seal during normal operation, is desirable.

Thus, for various reasons closure means to prevent loss of material from open-topped truck bodies are desirable. Moreover, it is desirable to provide a low-bed trailer design for a dump body of the character described to promote stability.

For example, U.S. Pat. No. 3,690,717 issued Sep. 12, 1972 discloses a vehicular transport including a low-bed trailer in which the spaced side frames of the superstructure, except for the connection between their bottom edges, are interconnected solely by vertically adjustable horizontal cross-ties on which the forward ends of track assemblies are swingably supported for vertical adjustment. The rear ends of the respective track assemblies are vertically adjustable independently. All of the supporting and adjusting means for such assemblies are located within vertical planes common to the respective side frames of the trailer.

U.S. Pat. No. 3,913,969 issued Oct. 21, 1975 discloses a closure for an open, top truck box. The rigid closure is hinged in a transverse axis near the upper front edge of the box body and has skirt portions which extend downwardly along sides of the box body in the closed position. Hydraulic cylinders open the closure and pressure of fluid supplied to the cylinders is limited to a per-selected value so that the cylinders can only raise the closure itself and cannot raise it if it carries an additional load. Thus it cannot be operated to serve as a crane or hoist and cannot be raised if a person is standing on it.

U.S. Pat. No. 4,120,513 issued Oct. 17, 1978 discloses a heavy duty, goose-neck implement trailer. The bed trailer is lowered to the ground by pivoting a rear frame and forward gooseneck toward the main bed. The main bed is raised from the ground by pivoting the rear frame and forward gooseneck away from the main bed. A battery, electric motor, and hydraulic pump mounted on the gooseneck provide hydraulic pressure to operate cylinders connecting the rear frame and gooseneck to the main bed.

U.S. Pat. No. 4,132,323 issued Jan. 2, 1979 shows a cargo trailer suitable for hauling large military tanks. The carrier is provided with a floor which has the rear portion raised about a front pivot for loading of tanks, which rear floor portion then is lowered about said front pivot to a carrying position. The load is constrained upon a low profile support. A removable floor bolts in place for the carrying of general cargo.

U.S. Pat. No. 4,627,658 issued Dec. 9, 1986 discloses a power-assisted, semi-trailer truck body cover hinged to the open-top trailer body. Two longitudinal half-frame sections include powered, rotating arms having rollers set in tracks which form the cabside ends of the half-frames. When the arms rotate, the half-frames will open or close with the rollers moving along the tracks and the rollers will slidably adjust to correct misalignment and ensure closure.

U.S. Pat. No. 5,259,647 issued Nov. 9, 1993 discloses a low bed truck trailer for transporting a structure over land. The frame comprises a low bed shelf for supporting loads at an elevation beneath the height of the tires. The resulting low center of gravity because of the height profile of the structure is reduced for both stabilization of the load as well as convenience of travel.

U.S. Pat. No. 5,498,066 issued Mar. 12, 1996 discloses an articulated cover for a top loading hauling body. A forward portion is pivotally connected to the truck hauling body and a rearward portion is pivotally connected to the forward portion. When the forward portion is raised, the rearward portion folds downwardly against and parallel to the forward portion. This reduces the height of the raised cover to approximately one-half of the cover total length. This structure permits the cover to extend substantially the full length of the open top of the body when closed and yet extend less than that distance when the cover is raised to the open position.

U.S. Pat. No. 5,868,453 issued Feb. 9, 1999 discloses a trucked security system wherein a substantially-horizontal platform designed to cover the entire top opening of the a truck cargo bed can be securely locked. The rigid, horizontal platform is hinged to the rear of the cargo bed, allowing the platform's front end to be raised to a convenient height for providing access to the interior of the cargo bed. A hydraulic cylinder operated by an integral hydraulic power unit is operator-controlled with a locking key switch. The top of the platform may be used to carry the payload which would normally be carried within the cargo bed. The platform, when raised hydraulically to a substantial angle, can serve as a dump bed.

U.S. Pat. No. 6,983,975 issued Jan. 10, 2006 discloses a powered cover system for an open-topped trailer. A cover carried by a support frame is pivotally mounted to a support frame including a triangular construct at the opposite ends to improve the rigidity of the cover system. A rotatable drive shaft pivots the cover between retracted and deployed positions. The drive assembly is reversible to accommodate covers mounted on either side of the container.

U.S. Pat. No. 8,876,217 issued Nov. 4, 2014 provides mobile, leak-proof container structured to contain a load after a truck rollover to minimize the risk of an environmental spill when hauling waste generated by the oil and gas industry. The container, such as a dump truck bed or a dump body, includes a central, leak-proof top-loading door, a rear tailgate for dumping the contents from the rear of the container; recessed framework having upper margins of the container walls and a door-jamb that define a reservoir; and a plurality of brace members for supporting the frame against the walls of the container. It also includes one or more corner panels covering the brace members and for preventing the loading of any load near the juncture of the roof framework and each respective adjoining side wall.

U. S. Published Application 2011/0187148 published Aug. 4, 2011 discloses a tensioning and lock device for achieving a sufficient amount of tension throughout a tarp cover. The present invention is particularly well suited for retractable, tarp cover systems used in the trucking industry, but is also useful in other applications and in other fields. The tensioning and lock device comprises a base and an extending mechanism comprising an actuator. The actuator may be of the hydraulic, pneumatic, or mechanical variation and can be either manually or automatically powered.

Despite the purported advantages of the aforesaid designs, there exists a need for ground operated, tilt-bed cargo trailers that can be easily raised for dumping, while maintaining a stable position so the trailer does not roll over when the center-of-gravity increases with a raised bed. Concurrently it is necessary to provide a ground-operated means for opening or closing the upper bed loading doors without requiring operator intervention atop the bed. Such a design must also resist extreme forces and remain sealed even during a vehicle roll over.

SUMMARY OF THE INVENTION

This invention provides a low-bed, highly stable dump trailer with a tilting bed and a ground-operated, upper loading cover that restrains heavy loads even during truck roll-overs and minor accidents.

An elongated trailer bed has a lowered, intermediate load portion disposed approximately in the middle. A rigid, elongated trailer neck emanating from the trailer front conventionally connects to the fifth wheel apparatus of a suitable tractor. A powerful hydraulic ram connected to the intermediate bed section raises or lowers the tiltable trailer which is suitably journaled for rotation at the trailer rear. When unloading, doors at the trailer rear must be open.

A unique, ground-operated door atop the cargo bed normally shrouds the trailer bed and seals the contents. A slidable, track mounted locking system is employed to forcibly lock the cover. Hydraulically powered, rack mounted latches can engage the cover to forcibly cramp it shut atop the trailer bed. The rigid, metallic cover comprises a plurality of spaced-apart tangs that project from both of its sides that can be forcibly engaged by the sliding locking mechanism in response to hydraulic cylinders. When loading the trailer bed, the cover is opened by suitable hydraulic controls accessible to an operator from the ground. When the locking apparatus slides out of engagement with the cover tangs, the cover may be forcibly pivoted upwardly to open the bed and expose the interior for trailer loading. When the trailer is loaded, the cover is again retracted, and the locking mechanism forcibly latches it by compressing it against the bed top.

Thus a basic object of my invention is to provide a rigid closure for a truck dump body of the top loading variety.

Another object is to provide a dump body of the character described with a rigid top cover that is forcibly and reliably locked or unlocked.

A related object is to enable a trailer bed cover of the character described to be forcibly locked and unlocked with controls accessible from the ground.

Another important object is to provide a fully enclosed dump body with a suitable cover that retains loads even when the trailer is subject to a roll over accident.

Another object is to provide a mobile, leak-proof, hydraulic tilting dump body with container structure for isolating a load after any rollover.

It is yet another object of the invention to provide a mobile, leak-proof container that uses a rigid, latched cover for fully enclosing the bed during transport to prevent spillage.

Another basic goal of my invention invention is to provide a truck trailer having a low bed with the center of gravity minimally elevated.

A related object is to provide such a truck bed with a low center of gravity to reduce the danger of tipping during either unloading or travel.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
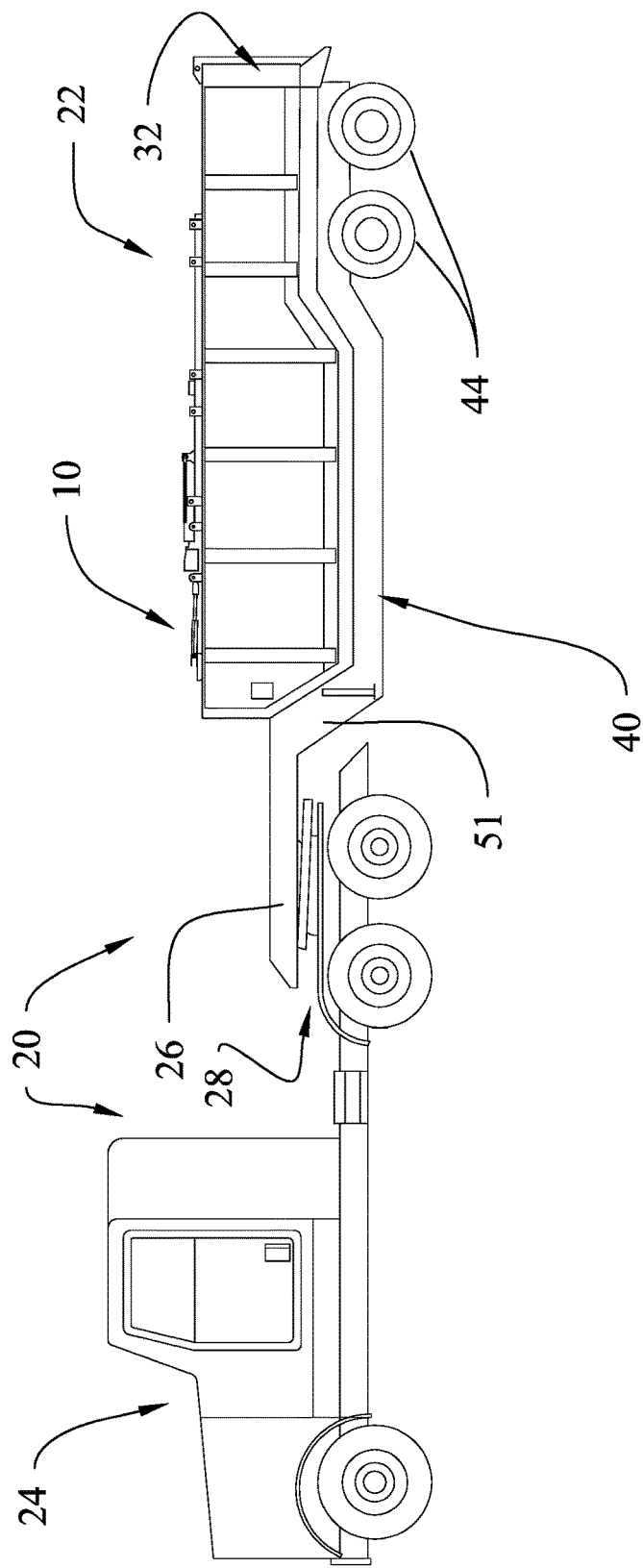
FIG. 1 is a left side elevational view of a diesel tractor coupled through a fifth wheel hitch to a low center-of gravity, tilt bed trailer constructed in accordance with the invention, with the trailer bed retracted to the over-the-road travel position.

With initial reference now directed to FIGS. 1-4 of the appended drawings, the reference numeral 20 broadly indicates a mobile arrangement suitable for safely hauling and disposing of environmentally regulated waste products such as drilling wastes and the like. The preferred trailer 22 can safely contain, confine and transport a variety of waste products, including toxic products, which are constrained within its bed by locked covers atop the bed, as detailed later. The construction is suitably rigid and dexterous so as to prevent spillage of the bed contents even during a collision or roll-over accident.

Figure 9:
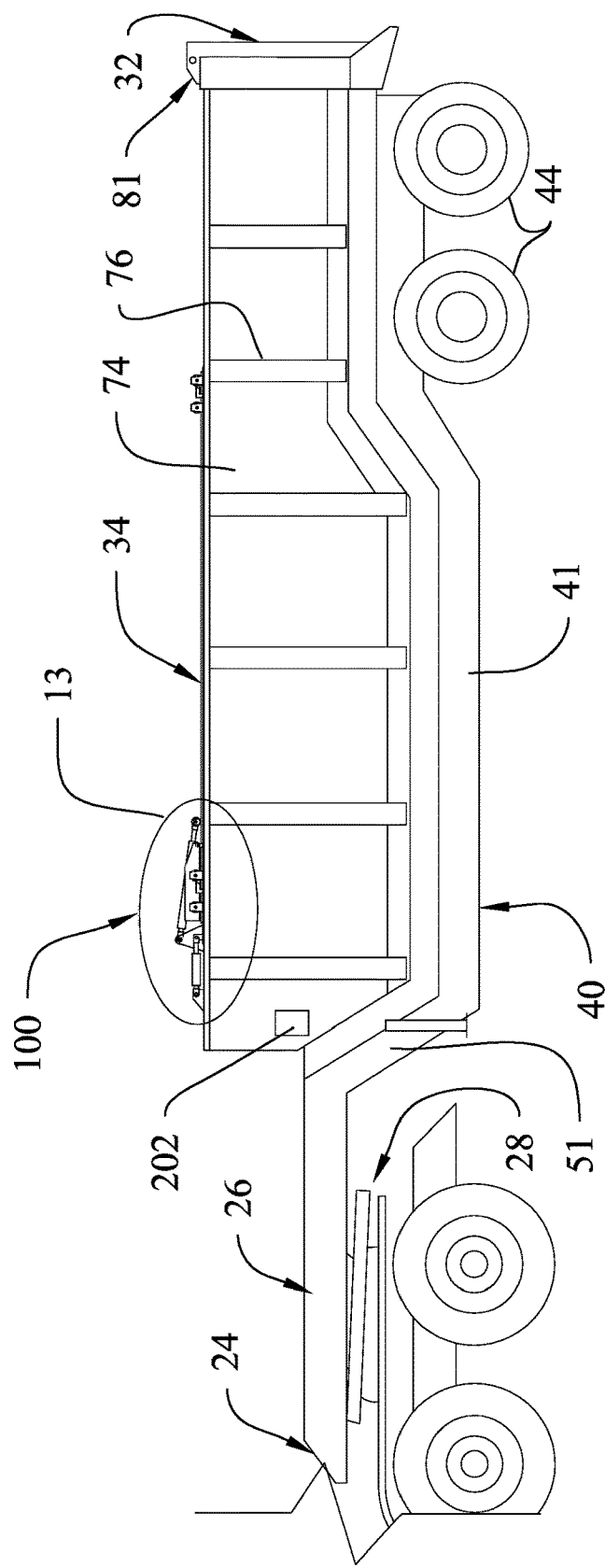
FIG. 9 is an enlarged, fragmentary elevational view of the trailer bed and the cover locking mechanism, with the cover disposed in the closed position.
Figure 10:
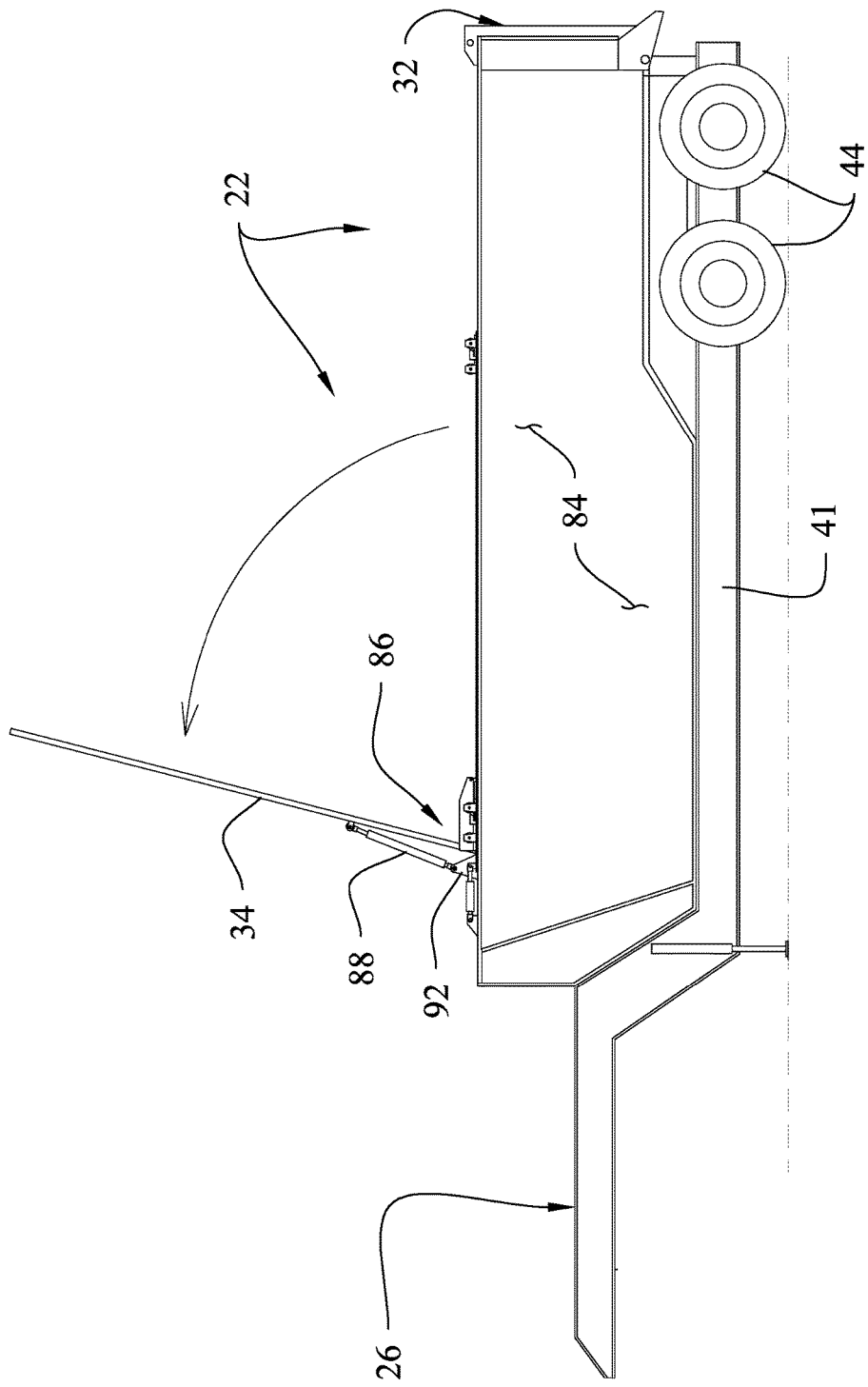
FIG. 10 is a diagrammatic view somewhat like FIG. 9, but showing the trailer cover opened with the locking mechanism released.

The trailer 22 is adapted to be towed by a diesel truck 24 of conventional construction. Trailer 22 comprises an elongated, rigid neck 26 that is coupled to the towing truck 24 by a conventional fifth-wheel apparatus 28, that will be recognized by those skilled in the art. When a load is delivered to a dump site, the trailer bed 30 may be elevated for material discharge through conventional doors 32 at the trailer rear end as detailed in FIGS. 3, 4 and 10, for example. Alternatively, an inclined rear floor in a trailer lacking a door can be employed. In either case, to load the trailer, a rigid cover 34 illustrated in FIGS. 9 and 10, for example, is hydraulically unlocked and then pivoted open to expose the cargo area. Cover 34 is disposed atop the upper trailer overlying outer surface 35. Where the rear door is omitted, the cover 34 will have an elongated end tip 37 to properly cover the open end 39 of the trailer.

Figure 2:
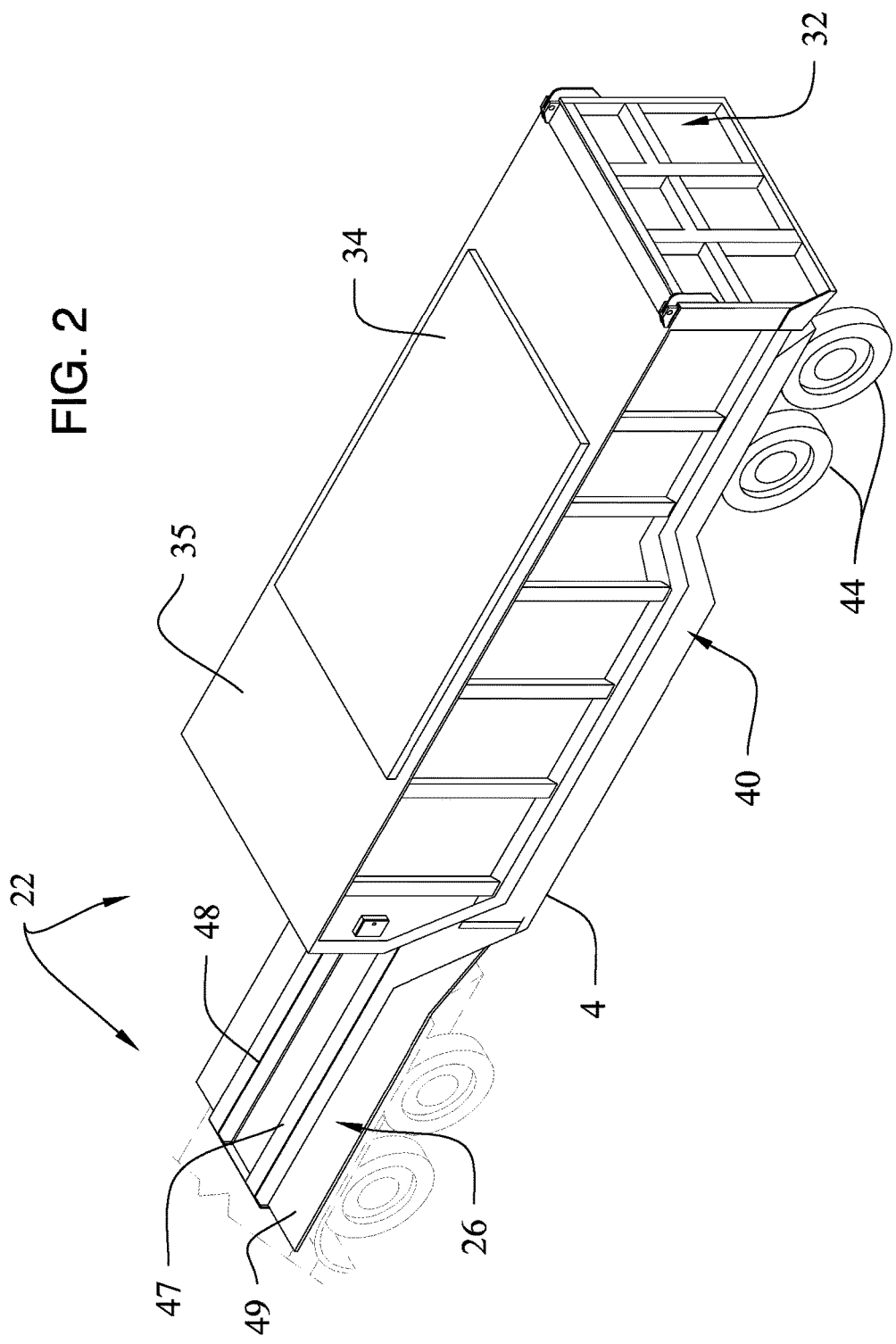
FIG. 2 is a fragmentary, left rear isometric view of the preferred trailer, showing the bed cover closed with the locking mechanism removed for clarity.
Figure 3:
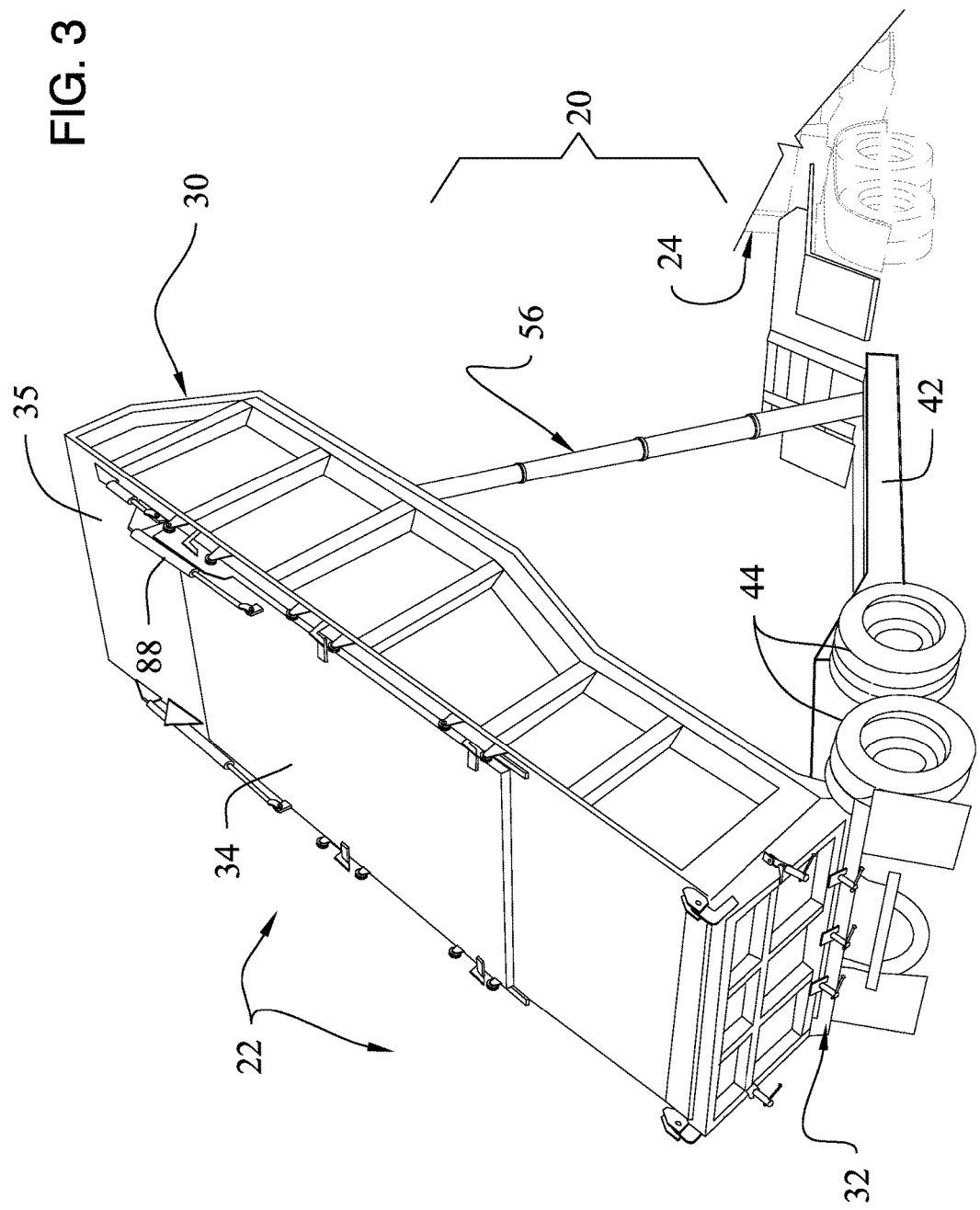
FIG. 3 is a fragmentary, right rear isometric view of the preferred trailer, showing the bed tilted for unloading, and with the bed cover closed.
Figure 4:
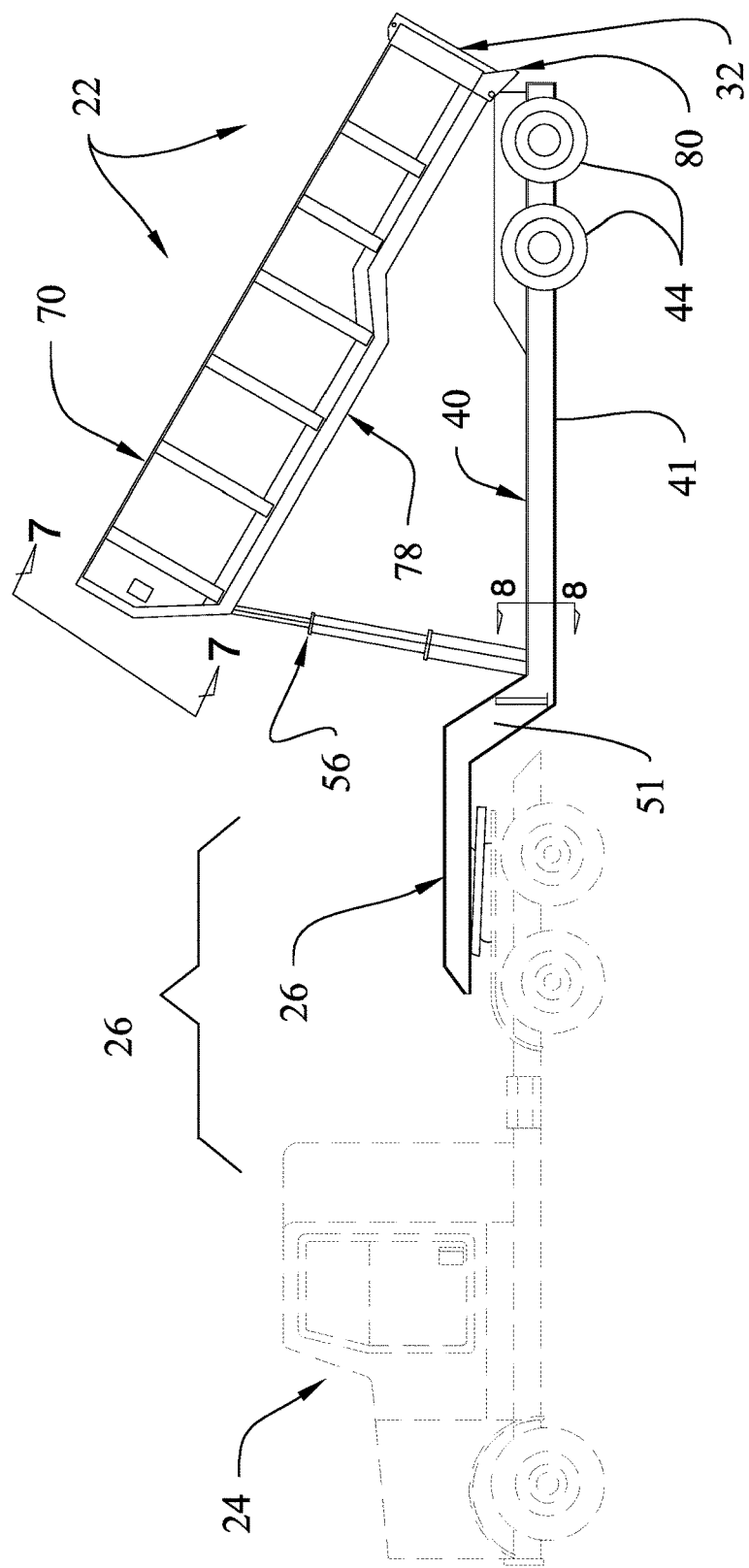
FIG. 4 is a fragmentary left side elevational view similar to FIG. 1, but with the trailer bed partially raised and tilted for unloading.
Figure 8:
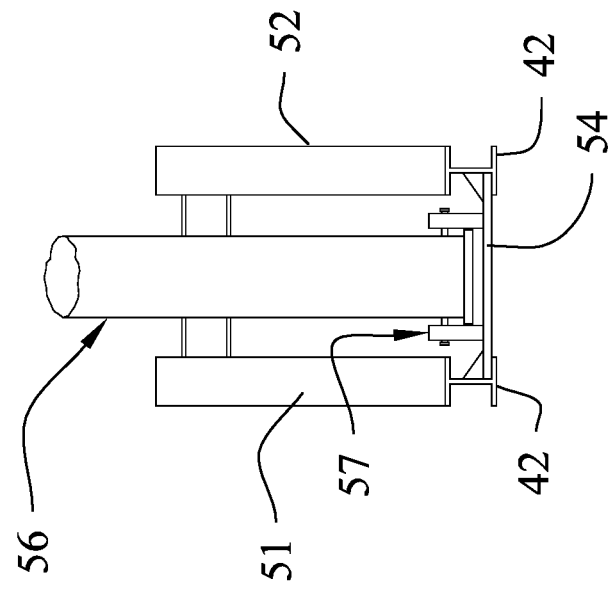
FIG. 8 is an enlarged, fragmentary sectional view taken generally along line 8-8 of FIG. 4.
Figure 7:
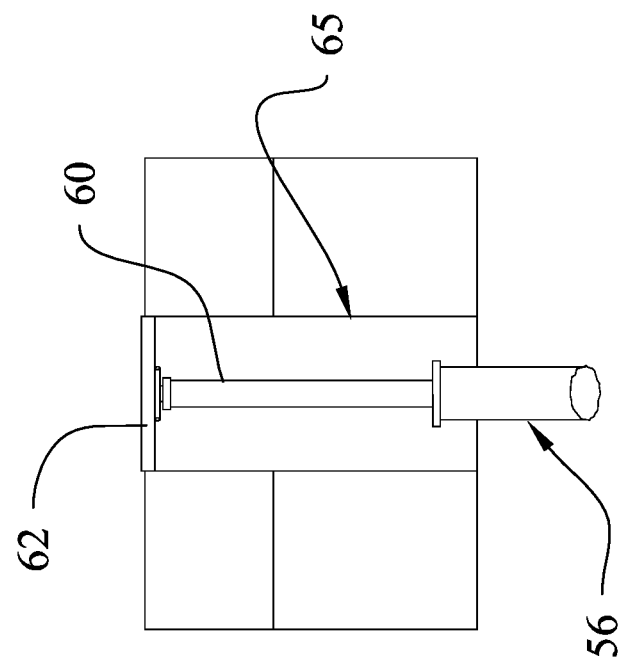
FIG. 7 is an enlarged, fragmentary sectional view taken generally along line 7-7 of FIG. 4.

The trailer 22 comprises a rigid, elongated steel frame, generally designated by the reference numeral 40 (FIG. 2). Preferably the frame comprises rigid steel I-beam components. A pair of spaced apart frame rails 41 and 42 (i.e., FIGS. 4, 3 respectively) form the intermediate section of the trailer. As viewed in FIG. 4, the frame intermediate section is low relative to the frame neck 26, preferably occupying a height approximately equal to the elevation of the axis of rotation of the rear trailer wheels 44. The wheeled axles occupy a hypothetical horizontal plane disposed above ground. As best seen in FIG. 2, the frame 40 extends forwardly to neck 26, which comprises a pair of elevated and spaced apart I-beam rails 47 and 48 that secure a lower planar surface 49 that overlies the fifth wheel coupling apparatus 28. Neck rails 47 and 48 are interconnected with frame rails 41 and 42 by spaced apart, angled I-beam frame sections 51, 52 (FIGS. 4, 8). As best seen in FIG. 8, a suitable, rigid cross piece 54 extends between frame rails 41 and 42 for bracing. Additionally cross piece 54 provides a support for a hydraulic tilt cylinder 56, which is preferably a heavy duty, five section hydraulic cylinder. The pivot mounting 57 (FIG. 8) allows slight pivoting at the base of the lift cylinder 56 in response to elongation and contraction. The uppermost ram 60 of the tilt cylinder 56 bears against a rigid terminus within a "doghouse" enclosure 65 (FIG. 7) within the front of the trailer bed described hereinafter in detail.

Figure 5:
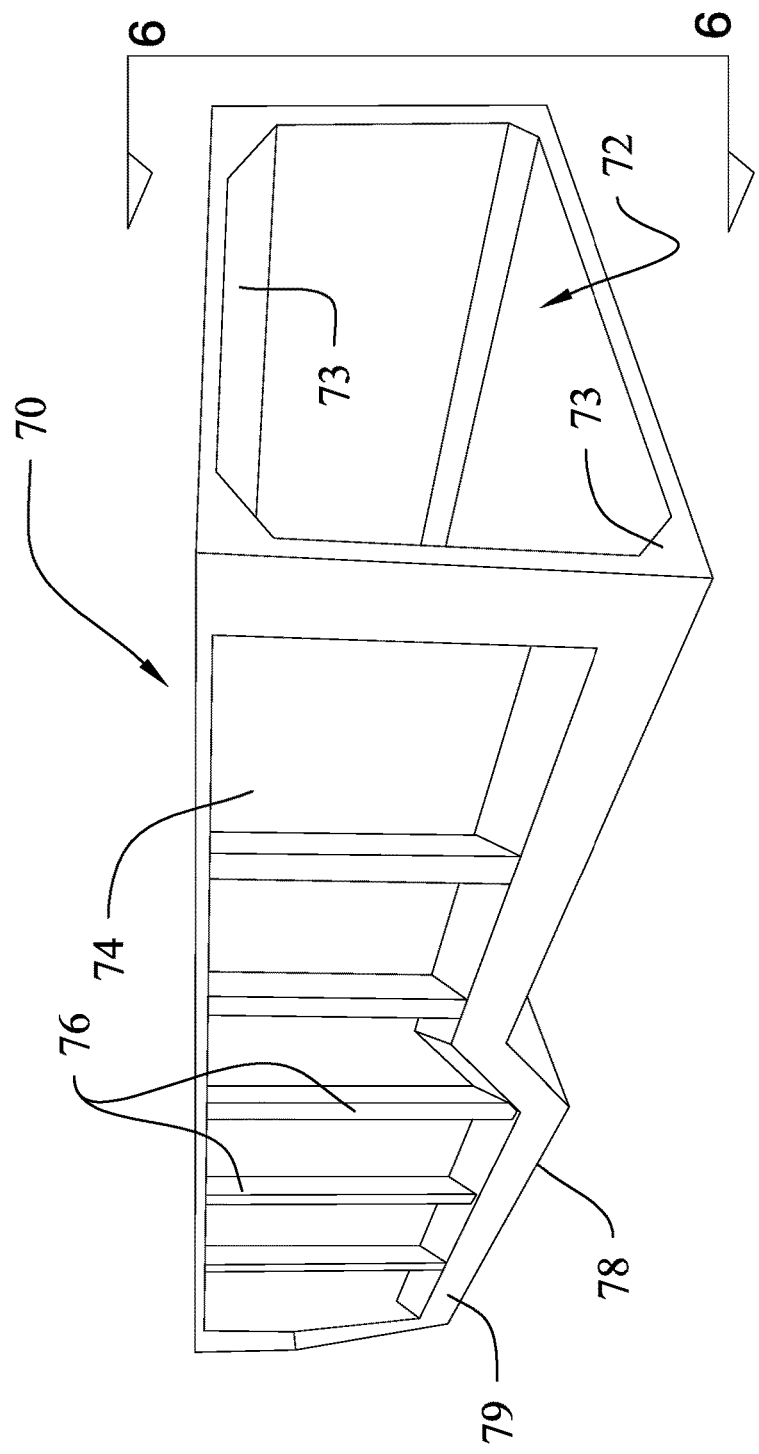
FIG. 5 is an enlarged, rear isometric view of the preferred trailer cargo bed.
Figure 6:
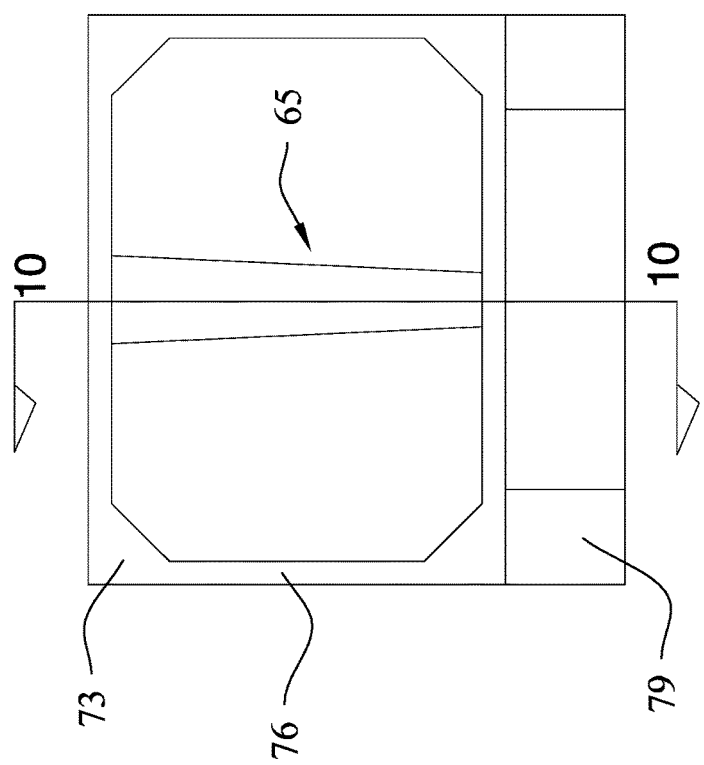
FIG. 6 is an enlarged, front plan view looking into the cargo bed of FIG. 5.
Figure 12:
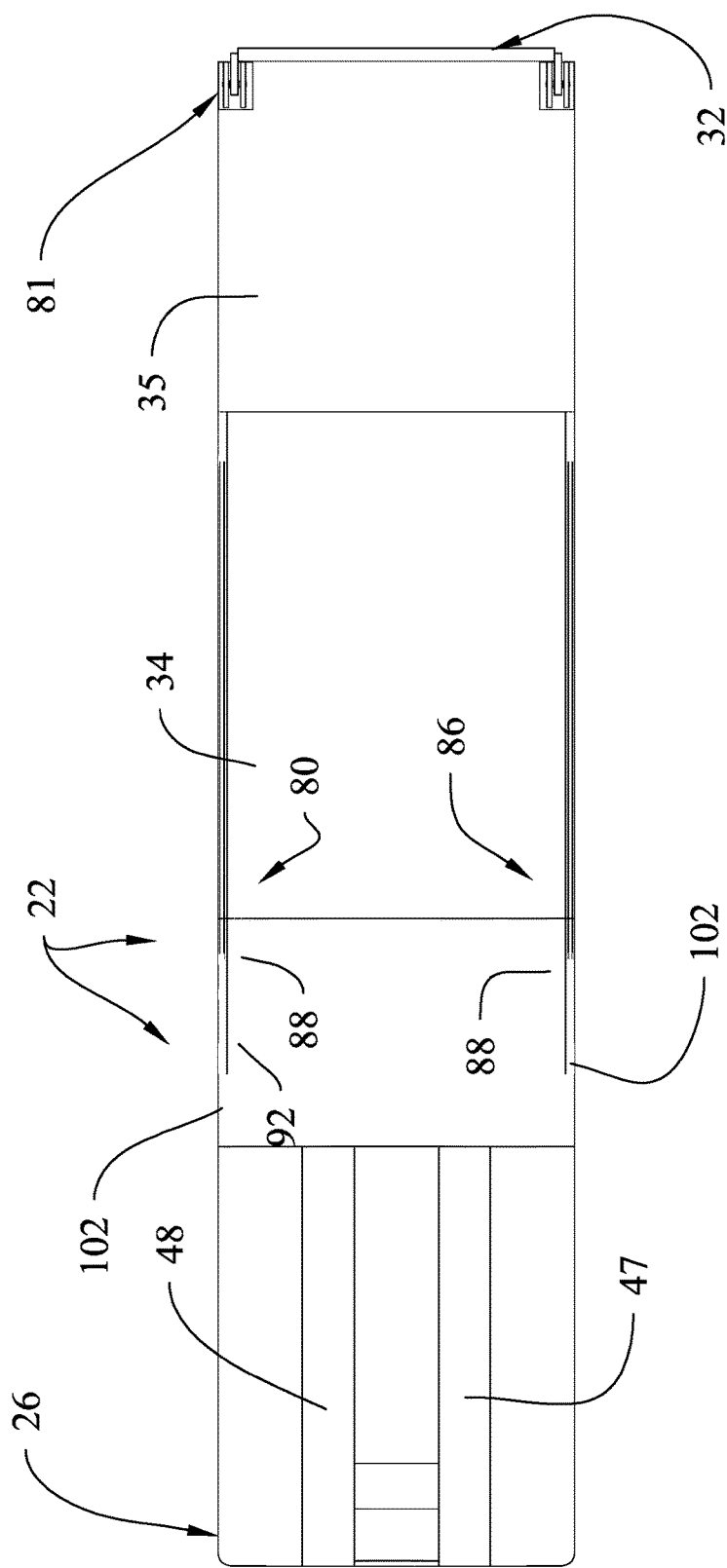
FIG. 12 is a top plan view of the trailer.

The preferred trailer bed 70 (FIG. 5) comprises a rigid, multiply reinforced enclosure of somewhat elongated and cubicle distentions. The bed rear 72 is generally rectangular, and in assembly and operation is closed by the conventional dumping doors 32 at the trailer rear. However, there are webbed reinforcements 73 internally running the length of the bed. The steel sidewalls 74 are periodically braced by rigid, spaced apart vertical braces 76. Importantly, the bed 70 comprises a lowered belly section 78, which, when the bed is lowered, nests between the trailer frame rails 41, 42 discussed earlier. Bed belly frame rails 79 (FIG. 5) are thus disposed proximate to and between the frame rails 41, 42 when the bed is lowered by cylinder 56, for example. It will be noted from FIG. 4, for example, that the bed 70 will terminate at its rear 72 with a pivot arrangement 80 that pivots it to the trailer frame rear. An upper pivoting structure 81 (i.e., FIGS. 9, 12) pivots the rear dumping doors 32. FIG. 6 illustrates the bed front interior, showing the protective doghouse enclosure 65 through which the cylinder 56 projects. When lowered to the hauling position the bed belly bottom is substantially the same height above ground as the hypothetical plane established by the trailer axles.

Figure 11:
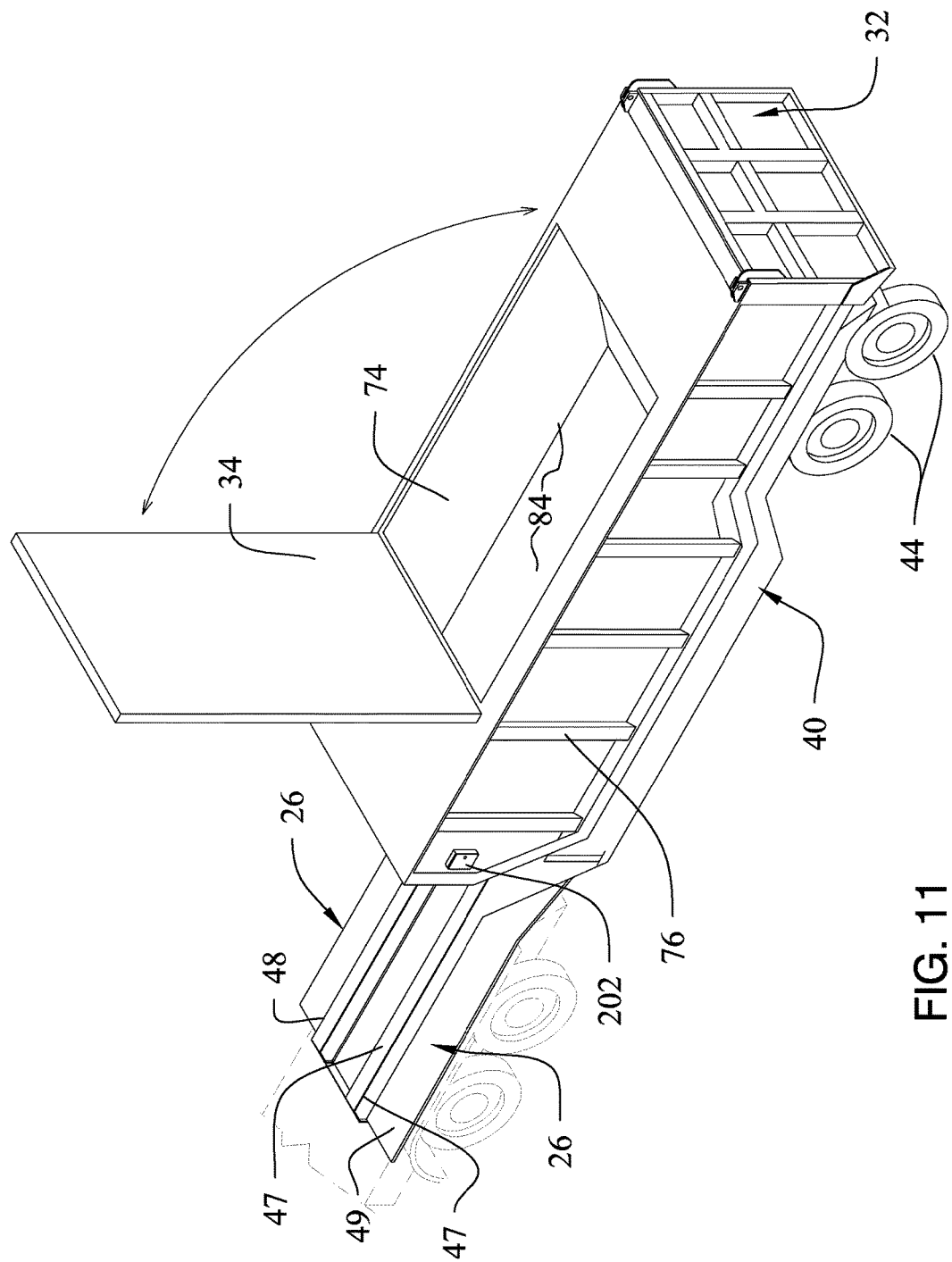
FIG. 11 is an enlarged, fragmentary isometric view of the trailer bed with the cover in the open or cargo loading position.
Figure 13:
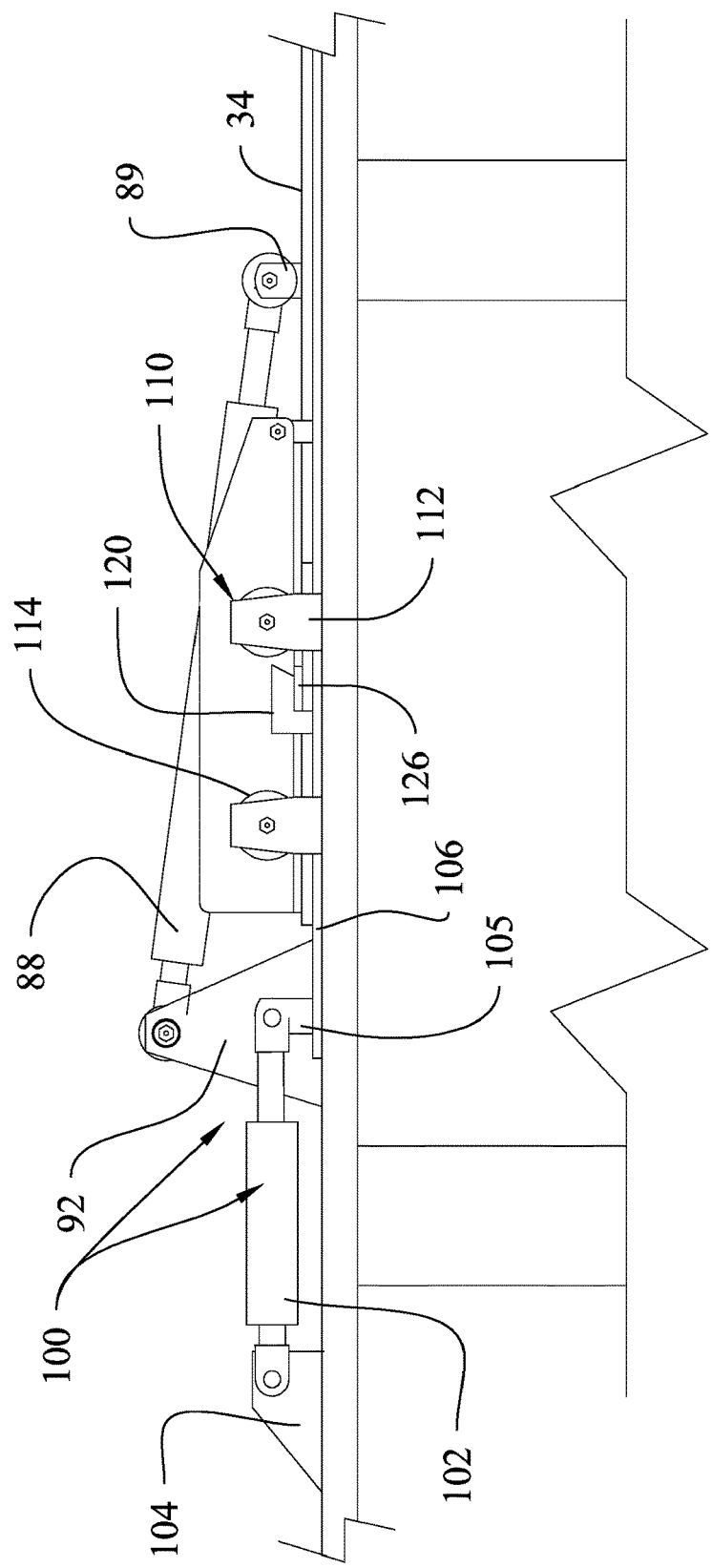
FIG. 13 is an enlarged, fragmentary elevational view of a preferred cover locking mechanism, derived from circled region 12 in FIG. 9, with the cover locked and closed.

The trailer 22 is loaded by properly positioning the trailer in the loading area such that the bed interior 84 (FIGS. 10, 11) is properly exposed and positioned. At this time the cover 34 must be elevated to expose the bed interior, and the open top of the cargo bed, as in FIG. 10. The rigid steel cover, preferably two inches thick, is coupled to the trailer top 35 and is pivoted at points 86 (FIG. 10) on both sides (i.e., FIG. 12). A pair of spaced apart cover-actuating cylinders 88 are coupled at one end to the cover to supports 89 (FIG. 13). The opposite cylinder end is pivotally secured to rigid webs 92 (i.e., FIG. 13). Hydraulic control is detailed hereinafter. Prior to pivoting the cover 34 into the open position of FIG. 10, however, the cover must be unlocked by the locking mechanism lying atop the trailer, which has been generally designated by the reference numeral 100. The purpose of the locking mechanism 100 is to securely, selectively compress the cover 34 against the top of the trailer to seal and enclose the bed interior 84.

Figure 14:
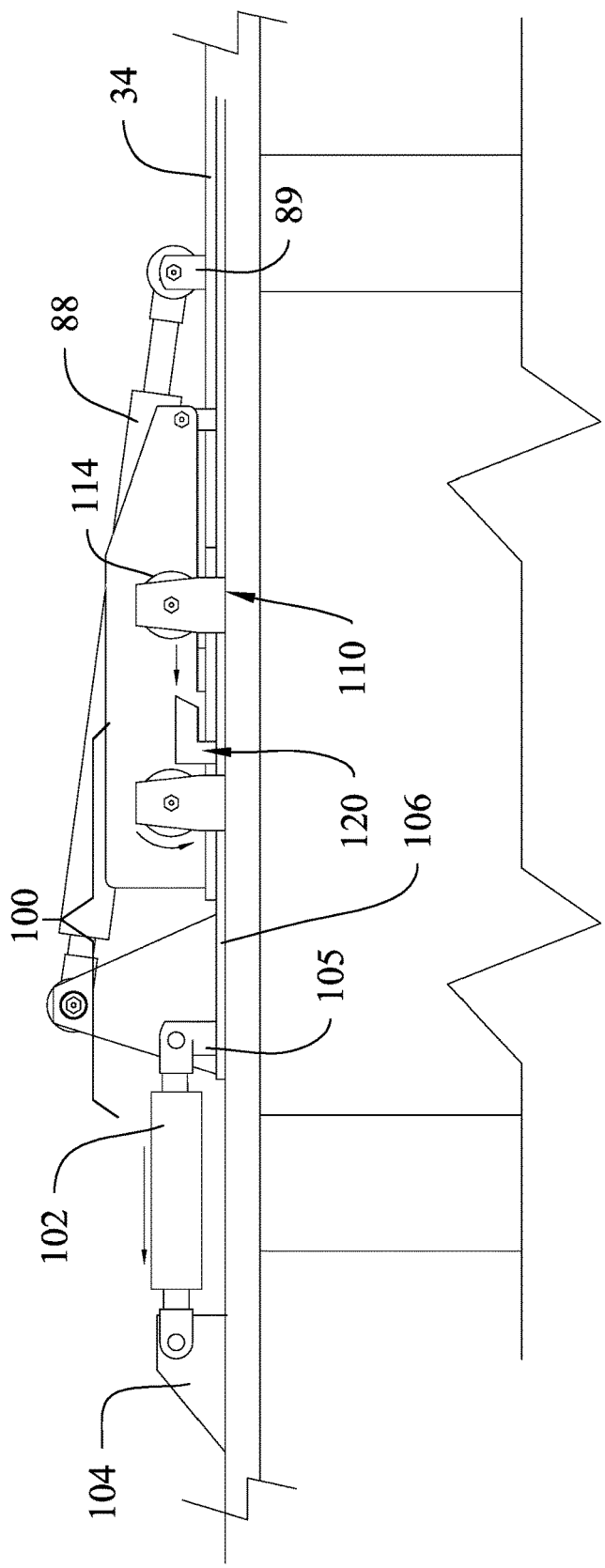
FIG. 14 is an enlarged, fragmentary elevational view of the cover locking mechanism similar to FIG. 13, but showing the lock retracted and the cover unlatched.
Figure 15:
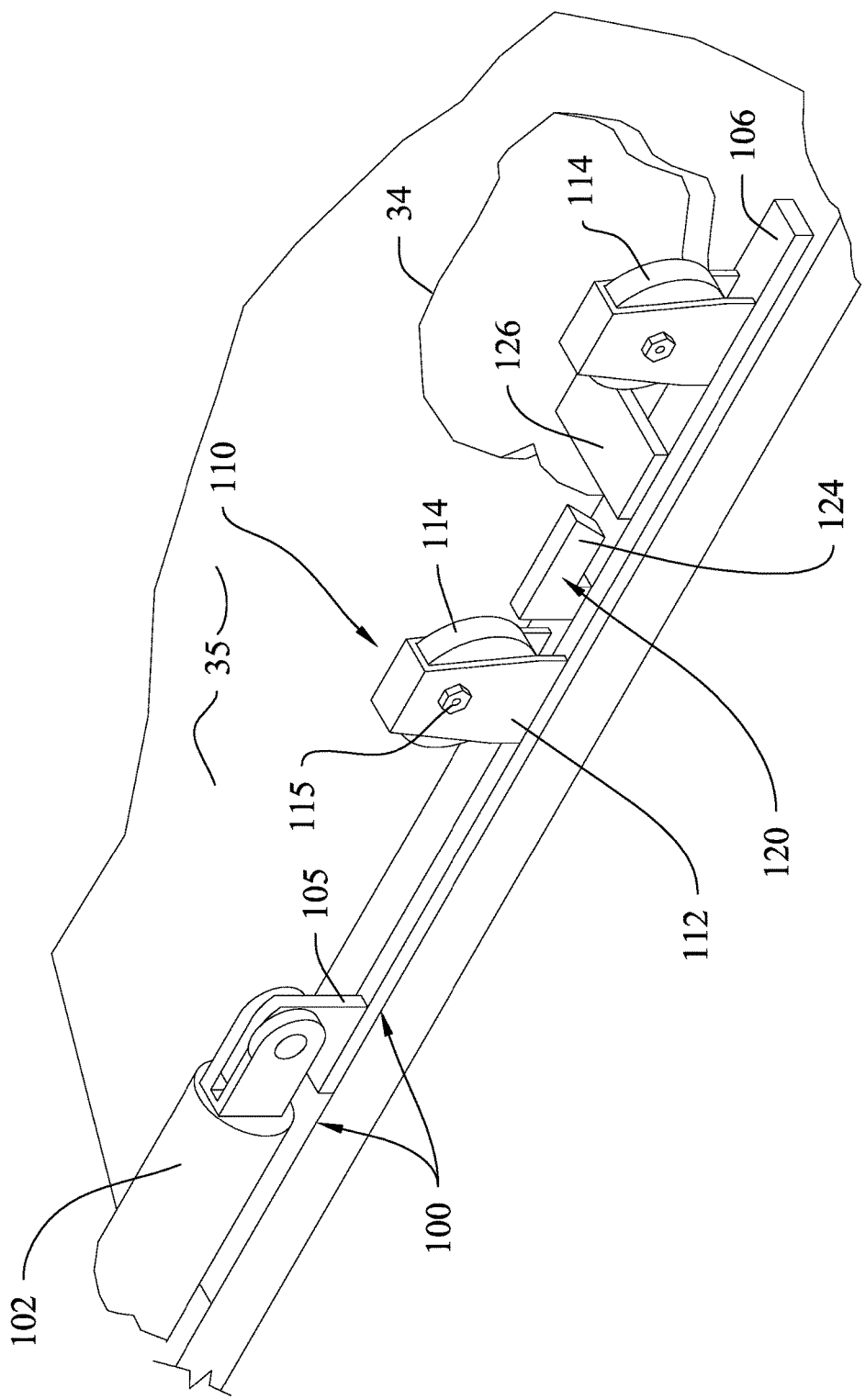
FIG. 15 is an enlarged, fragmentary isometric view showing the various lock parts, its retainer and track and its hydraulic actuator; and, FIG. 16 is a schematic diagram of the cargo bed hydraulic system.

Referencing FIGS. 13-15, the cover locking mechanism 100 comprises suitable hydraulic cylinders 102 on each side of the trailer top. Each cylinder is pivotally secured to a rigid web 104, and terminates in an anchor 105 secured to a sliding track 106. There is a parallel track 106 on each side of the cover 34. The tracks 106 can be shifted longitudinally, and are displaceable along their longitudinal axis parallel with the cover 34. Preferably there are a plurality of spaced apart roller assemblies 110 disposed on each side of the trailer top proximate the tracks 10. The roller assemblies 110 comprise protective housings 112 whose sides enclose a rotatable roller 114 journalled about an axis of rotation established at 115 (FIG. 15). The roller assemblies limit upward displacements of the tracks 106, and side-to-side motion as well.

Importantly, the locking tracks 106 each support a plurality of spaced apart latches 120 (i.e., FIGS. 13-15) that include slightly elevated horizontal projections 124. A plurality of tangs 126 extend from the sides of the cover 34. When the locking tracks 106 are displaced by the hydraulic cylinders 102 described earlier, the latches 120 engage the cover's tangs 126. More particularly, the horizontal latch projections 120 are forcibly jammed over the cover tangs 126 to hold down the cover 34. However, when the latches 120 forcibly engage the cover tangs 126 to lock the cover, any resultant upward displacement of the locking tracks 106 is forcibly resisted by the roller assembly wheels 114.

Figure 16:
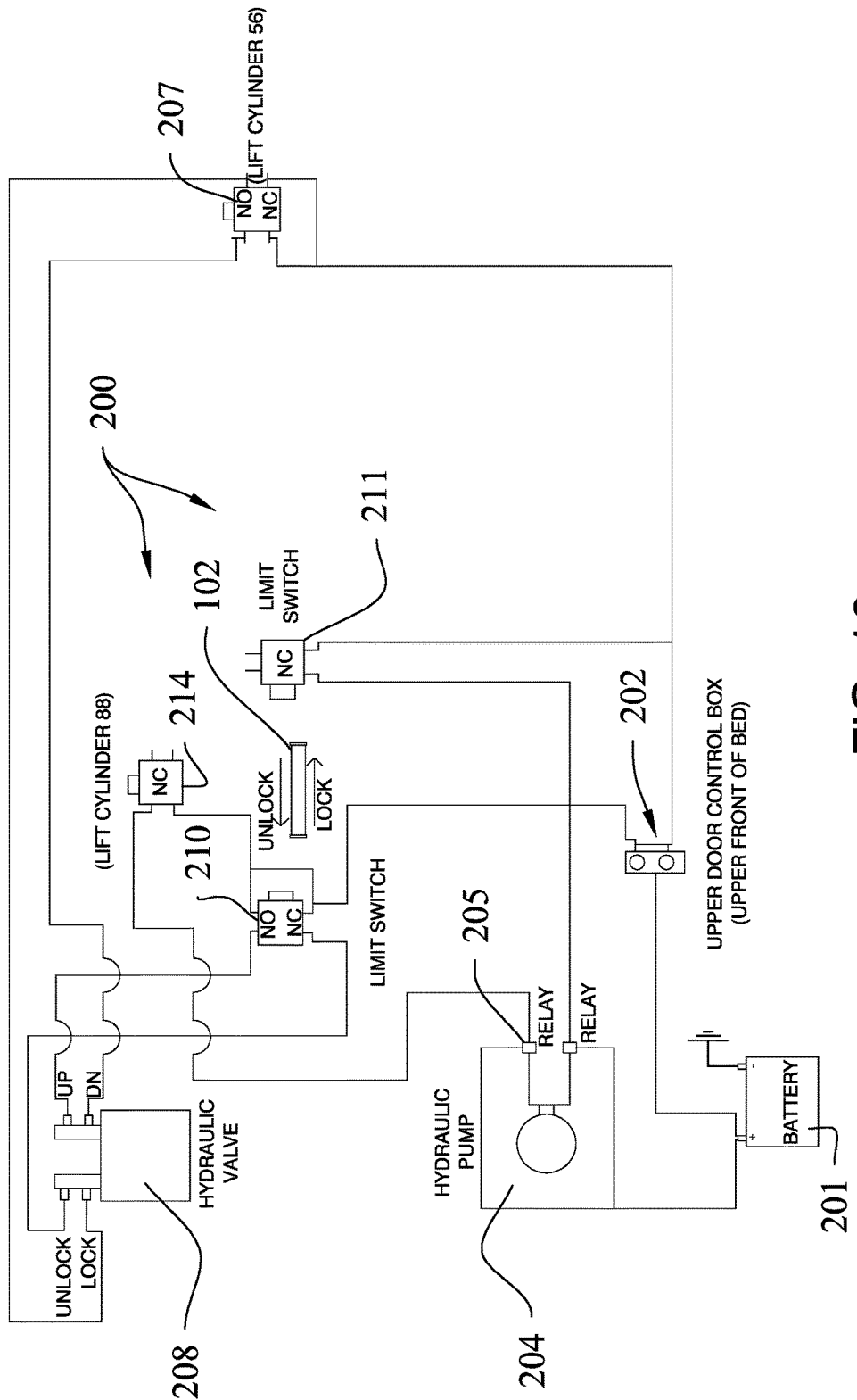

FIG. 16 illustrates a basic electrical-hydraulic control diagram for the apparatus. It will be appreciated by those skilled in the art that a variety of different circuits could be employed to adequately establish hydraulic operation. The preferred electrical hydraulic circuit 200 (FIG. 16) contemplates interconnection with the vehicle electric system and battery 201. An operator control switch 202 (i.e., FIGS. 11, 16) that is accessible by an operator on the ground operates the various cylinders described previously. A conventional pump 204 supplies hydraulic pressure through suitable relays 205. The trailer lift cylinder 56 (i.e., FIG. 3) is controlled by a relay 207 in response to hydraulic valve 208. When the lift cylinder 56 is contracted, and the trailer bed is down, the cover 34 and its locking mechanism 100 (i.e., FIG. 15) may be operated. The cover 34 is unlocked by displacing the previously described tracks 106 with cylinders 102 represented diagrammatically in FIG. 16. Travel of the locking tracks 106 is limited by limit switches 210 and 211. The cover lift cylinder 88 represented diagrammatically in FIG. 16 is actuated by relay valve 214.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:

1. A towable trailer adapted to be coupled to a tow vehicle for hauling and discharging materials, the trailer comprising:
   a tiltable trailer bed comprising an interior adapted to contain cargo;
   the bed comprising a rear discharge area;
   means for selectively raising and lowering said bed;
   a rigid cover pivotally mounted atop the trailer for selectively exposing the trailer interior for loading;
   means for selectively pivoting said cover between bed open and bed closed positions when the cover is unlocked;
   a locking mechanism for selectively locking said cover in place atop said trailer bed, the locking mechanism comprising:
   a pair of sliding tracks disposed atop the trailer bed;

means for selectively slidably displacing said tracks;
a plurality of spaced apart tangs projecting from said cover;
spaced apart, displaceable latches projecting from said tracks for selectively engaging said tangs in response to track movement; and,
a plurality of spaced apart roller assemblies for constraining said tracks.

2. The trailer as defined in claim 1 wherein the roller assemblies comprise protective housings comprising sides enclosing a rotatable roller that limits upward displacements of the tracks.

3. The trailer as defined in claim 1 further comprising an electrical-hydraulic control for operating said means for selectively raising and lowering said bed, said means for selectively pivoting said cover, and said means for selectively slidably displacing said tracks, the control disposed at ground level for convenient access by an operator.

4. The trailer as defined in claim 1 wherein the bed comprises a belly section that is substantially coextensive with a plane defined by the wheeled axles and wherein the trailer comprises a doghouse enclosure for protecting at least a portion of said means for selectively raising and lowering said bed.

5. A towable trailer for containing, hauling and discharging materials such as waste products, the trailer comprising:
a rigid frame comprising a pair of side rails, the frame supporting at least a pair of spaced-apart wheeled axles;
an elongated, rigid neck projecting from the frame adapted to be coupled to a tow vehicle;
a tiltable trailer bed supported by and pivotally coupled to said frame, the trailer bed comprising an intermediate belly section nested within said frame when the bed is lowered, an open top, and an interior adapted to contain cargo loaded through said open top;
the bed comprising a rear discharge area supporting a door;
means for selectively raising and lowering said bed;
a rigid cover pivotally mounted atop the trailer for selectively exposing the trailer interior for loading, the cover having a pair of spaced apart sides;
means for selectively pivoting said cover between bed open and bed closed positions; and,
a locking mechanism for selectively locking said cover in place atop said trailer bed by compressing it against the top of the trailer to seal and enclose the interior, wherein the locking mechanism comprises:
a pair of spaced apart, parallel sliding tracks disposed atop the trailer bed on opposite sides thereof, each track having a longitudinal axis;
means for selectively slidably displacing said tracks along their longitudinal axis;
a plurality of spaced apart roller assemblies on each side of said top for constraining said tracks;
a plurality of spaced apart tangs; and,
a plurality of spaced apart, displaceable latches adapted to engage said tangs in response to track movement to sealably lock said cover.

6. The trailer as defined in claim 5 further comprising an electrical-hydraulic control for operating said
means for selectively raising and lowering said bed, said means for selectively pivoting said cover, and said means for selectively displacing said tracks,
the control disposed at ground level for convenient access by an operator.

7. The trailer as defined in claim 6 wherein the roller assemblies comprise protective housings comprising sides enclosing a rotatable roller that limits upward displacements of the tracks.

8. The trailer as defined in claim 7 wherein the bed belly section is substantially coextensive with a plane defined by the wheeled axles.

9. The trailer as defined in claim 8 further comprising a doghouse enclosure for protecting at least a portion of said means for selectively raising and lowering said bed.

10. A towable trailer for containing, hauling and discharging materials such as waste products, the trailer comprising:
a rigid frame comprising a pair of side rails, the frame supporting at least a pair of spaced-apart wheeled axles;
an elongated, rigid neck projecting from the frame adapted to be coupled to a tow vehicle;
a tiltable trailer bed supported by and pivotally coupled to said frame, the trailer bed comprising an intermediate belly section nested within said frame when the bed is lowered, an open top, and an interior adapted to contain cargo loaded through said open top;
the bed comprising an open rear discharge area with an inclined floor;
means for selectively raising and lowering said bed;
a rigid cover pivotally mounted atop the trailer for selectively exposing the trailer interior for loading, the cover having a pair of spaced apart sides;
means for selectively pivoting said cover between bed open and bed closed positions; and,
a locking mechanism for selectively locking said cover in place atop said trailer bed by compressing it against the top of the trailer to seal and enclose the interior, the locking mechanism comprising:
a pair of spaced apart, parallel sliding tracks disposed atop the trailer bed on opposite sides thereof, each track having a longitudinal axis;
means for selectively slidably displacing said tracks along their longitudinal axis;
a plurality of spaced apart roller assemblies on each side of said top for constraining said tracks;
a plurality of spaced apart tangs; and,
a plurality of spaced apart, displaceable latches, said latches adapted to engage said tangs in response to track movement to sealably lock said cover.

11. The trailer as defined in claim 10 further comprising an electrical-hydraulic control for operating said
means for selectively raising and lowering said bed, said means for selectively pivoting said cover, and said means for selectively displacing said tracks,
the control disposed at ground level for convenient access by an operator.

12. The trailer as defined in claim 11 wherein the roller assemblies comprise protective housings comprising sides enclosing a rotatable roller that limits upward displacements of the tracks.

13. The trailer as defined in claim 12 wherein the bed belly section is substantially coextensive with a plane defined by the wheeled axles.

14. The trailer as defined in claim 13 further comprising a doghouse enclosure for protecting at least a portion of said means for selectively raising and lowering said bed.

* * * * *